United States Patent
Kawamura et al.

(10) Patent No.: US 6,706,431 B2
(45) Date of Patent: Mar. 16, 2004

(54) FUEL CELL

(75) Inventors: Naotake Kawamura, Tokyo (JP); Kazuhide Ota, Aichi (JP); Ken K. Inouye, Monterey Park, CA (US)

(73) Assignee: Fullerene USA, Inc., Alhambra, CA (US)

(*) Notice: Subject to any disclaimer, the term of this patent is extended or adjusted under 35 U.S.C. 154(b) by 192 days.

(21) Appl. No.: 09/865,846

(22) Filed: May 25, 2001

(65) Prior Publication Data

US 2002/0061433 A1 May 23, 2002

(30) Foreign Application Priority Data

Nov. 14, 2000 (JP) .................................. 2000-346526
Dec. 18, 2000 (JP) .................................. 2000-384120

(51) Int. Cl.$^7$ ............................................. H01M 4/96
(52) U.S. Cl. ............................ 429/13; 429/40; 429/44
(58) Field of Search .............................. 429/13, 40, 45

(56) References Cited

U.S. PATENT DOCUMENTS

| | | | |
|---|---|---|---|
| 5,176,966 A | 1/1993 | Epp et al. ................. | 429/26 |
| 5,246,792 A | 9/1993 | Watanabe .................. | 429/33 |
| 5,277,996 A | 1/1994 | Marchetti et al. | |
| 5,470,680 A | 11/1995 | Loutfy et al. ............. | 429/218 |
| 5,472,799 A | 12/1995 | Watanabe .................. | 429/30 |
| 5,712,054 A | 1/1998 | Kejha | |
| 5,753,088 A | 5/1998 | Olk ......................... | 204/173 |
| 5,800,938 A | 9/1998 | Watanabe .................. | 429/30 |
| 6,030,718 A | 2/2000 | Fuglevand et al. ......... | 429/26 |
| 6,218,035 B1 | 4/2001 | Fuglevand et al. ......... | 429/30 |
| 6,440,610 B1 * | 8/2002 | Sheem et al. ............. | 429/40 X |
| 6,485,858 B1 * | 11/2002 | Baker et al. .............. | 429/40 |

FOREIGN PATENT DOCUMENTS

| | | | | |
|---|---|---|---|---|
| EP | 1071149 A2 | 1/2001 | ............ | H01M/8/10 |
| JP | 08-031444 | 2/1996 | ............ | H01M/8/10 |
| JP | 2000-228209 | 8/2000 | ............ | H01M/8/04 |
| JP | 2000-243406 | 9/2000 | ............ | H01M/4/90 |
| JP | 2000-243422 | 9/2000 | ............ | H01M/8/04 |
| JP | 2000-251913 | 9/2000 | ............ | H01M/8/04 |
| JP | 2000-294263 | 10/2000 | ............ | H01M/8/04 |
| JP | 2000-315512 | 11/2000 | ............ | H01M/8/04 |
| JP | 2000-342977 | 12/2000 | ............ | H01M/8/06 |
| WO | WO 01/17900 A1 | 3/2001 | ............ | H01M/4/24 |

OTHER PUBLICATIONS

English Translation of Japanese Kokai 8–031,444 Document Published Feb. 1996.*
Larminie, James et al., "Fuel Cell Systems Explained", 2000, pp. 61–69, 84–89, John Wiley & Sons, Ltd., West Surrex, England, (no month).
Berber, Savas et al., "Electronic and Structural Properties of Carbon Nanohorns", Physical Review B, Jul. 2000, vol. 62, No. 4, p. R2291–4.
Che, G. et al.: "Carbon Nanotubule Membranes For Electrochemical Energy Storage And Production," Nature, vol. 393, May 28, 1998, pp. 346–349.
Che, G. et al.: "Metal Nanocluster Filled Carbon Nanotubes: Catalytic Properties and Possible Applications in Electrochemical Energy Storage and Production," Langmuir, vol. 15, No. 3, 1999, pp. 750–758.
Patent Abstracts of Japan, vol. 1996, No. 6, Jun. 28, 1996, JP 08 031444, Japan Storage Battery Co., Ltd (English Translation of Abstract).
Patent Abstracts of Japan, vol. 2000, No. 12, Jan. 3, 2001, JP 2000 243406, Toyota Motor Corp., (English Translation of Abstract).
PCT Search Report dated Mar. 5, 2002 for PCT/US01/16979.

* cited by examiner

*Primary Examiner*—Stephen Kalafut
(74) *Attorney, Agent, or Firm*—Fulwider Patton Lee & Utecht, LLP

(57) ABSTRACT

A fuel cell having an electrode and/or catalyst formed from a nano-carbon material, such as fullerene, carbon nanotube, carbon nanohorn, carbon nano-fiber or metal encapsulated fullerene. Such fuel cells may not use platinum in the electrode or catalyst, or may use platinum in small amounts. The efficiency of the fuel cell may be increased by applying external energy to the electrode and/or catalyst. A cationic membrane may be positioned between the cathode and anode of the fuel cell. Also disclosed is an improved method for generating electricity from a fuel cell having at least one electrode formed from a nano-carbon material. To increase the efficiency of the fuel cell, the electrode or catalyst containing nano-carbon material may be irradiated with blue color diode light, or an electric current may be directed to the nano-carbon material.

6 Claims, No Drawings

FUEL CELL

CROSS-REFERENCE TO RELATED APPLICATIONS

This application claims priority under 35 U.S.C. §119 to Japanese Application Ser. No. 2000-346526, filed Nov. 14, 2000, and to Japanese Application Ser. No. 2000-384120, filed Dec. 18, 2000, both applications are hereby incorporated herein by reference.

BACKGROUND OF THE INVENTION

This invention relates to electrochemical fuel cells and methods for making an electrochemical fuel cell. More particularly, the present invention is directed to a fuel cell system having electrodes incorporating hydrogen storable substances, such as fullerenes, carbon nanotubes, carbon nanohorns, carbon nanofibers and metal encapsulated fullerenes.

Fuel cells combine hydrogen and oxygen without combustion to form water and to produce direct current electric power. The process can be described as electrolysis in reverse. Fuel cells have potential for stationary and portable power applications; however, the commercial viability of fuel cells for power generation in stationary and portable applications depends upon solving a number of manufacturing, cost, and durability problems.

Electrochemical fuel cells convert fuel and an oxidant to electricity and a reaction product. A typical fuel cell consists of a membrane and two electrodes, called a cathode and an anode. The membrane is sandwiched between the cathode and anode. Fuel, in the form of hydrogen, is supplied to the anode, where a catalyst, such as platinum and its alloys, catalyzes the following reaction:

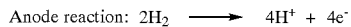

Anode reaction: $2H_2 \longrightarrow 4H^+ + 4e^-$

At the anode, hydrogen separates into hydrogen ions (protons) and electrons. The protons migrate from the anode through the membrane to the cathode. The electrons migrate from the anode through an external circuit in the form of electricity. An oxidant, in the form of oxygen or oxygen containing air, is supplied to the cathode, where it reacts with the hydrogen ions that have crossed the membrane and with the electrons from the external circuit to form liquid water as the reaction product. The reaction is typically catalyzed by the platinum metal family. The reaction at the cathode occurs as follows:

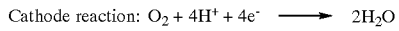

Cathode reaction: $O_2 + 4H^+ + 4e^- \longrightarrow 2H_2O$

Thus, the fuel cell generates electricity and water through the electrochemical reaction.

In a known hydrolysis cell, a cationic membrane is positioned between platinum containing electrodes. In such a hydrolysis cell, the following electrochemical reactions occur:

Cathode: $2H_2O \longrightarrow O_2 + 4H^+ + 4e^-$

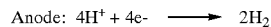

Anode: $4H^+ + 4e^- \longrightarrow 2H_2$

The most promising fuel cells for widespread transportation use are Proton Exchange Membrane (PEM) fuel cells. PEM fuel cells operate at relatively low temperatures, have a relatively fast response time and have relatively high energy density compared to other fuel cell technologies. Current PEM fuel cells rely on flat-plate electrodes. Any fuel cell design should: (a) allow for supply of the reactants (typically, hydrogen and oxygen); (b) allow for mass transport of the reaction product (water) and associated inert gases (nitrogen and carbon dioxide from air); and (c) provide electrodes to support the catalyst, to collect electrical charge, and to dissipate heat. Electrical and thermal resistance, reactant pressures, temperatures, surface area, catalyst availability are some of the major factors affecting the performance and efficiency of a fuel cell. Some problems encountered in the use of PEM fuel cells include the need to reduce thermal stress concentrations, and the need to increase integrity and performance of the fuel cell.

In recent years, new "nano" carbon materials have being produced, and they may be considered as the future storage material of hydrogen for a new generation energy producing and storage devices. However, it is difficult to put compressed hydrogen in a container constructed from such "nano" carbon materials. For example, certain hydrogen storable substances, such as a carbon nanotube or a carbon nanofiber, have a storage capacity of about ten kilograms/meter$^3$ (kg/m$^3$). Since the chargeable ratio is about fifty percent, then the actual stored hydrogen is five kg/m$^3$. Especially for the use of hydrogen fuel cells in automobiles, airplanes and other moving transports, it is necessary to safely store hydrogen, so as to avoid hydrogen combustion in the fuel cell. In addition, a system is needed to quickly supply hydrogen to the fuel cell anode.

When hydrogen storable metal compounds are used, repeated input and output of hydrogen leads to degradation of the compound. Further, the mass ratio of the storable hydrogen to the metal used is very low. Consequently, when the hydrogen storable metal compounds contain precious metals, such as platinum, the cost is prohibitively high, and thus, not suitable of such fuel cells for most applications of the technology.

What has been needed and heretofore unavailable is a safe, efficient and cost effective fuel cell, which is suitable for mass production. The present invention satisfies this need.

SUMMARY OF THE INVENTION

Briefly, and in general terms, the present invention is directed to a fuel cell having an electrode or catalyst formed from a nano-carbon material, such as fullerene, carbon nanotube, carbon nanohorn, carbon nanofiber and metal encapsulated fullerene. Such an encapsulated fullerene may include a metal from the platinum metal family, including platinum, palladium, rhodium, iridium, osmium and ruthenium. The present invention is applicable to a sandwich-type electrolyte fuel cell, having a first electrode, a second electrode formed from a nano-carbon material and an ion exchange membrane positioned between the first electrode and the second electrode. The efficiency of the fuel cell may be increased by applying external energy to the electrode and/or catalyst.

The present invention relates to fuel cells utilizing hydrogen as the fuel and oxygen containing air as the oxidant. An improvement over previously known fuel cells is that at least one electrode or the catalyst is formed from a hydrogen storable carbon material, such as fullerenes, carbon nanotubes, carbon nanohorns, nanofibers, metal encapsulated fullerenes. Such a fuel cell may include a cationic membrane positioned between the cathode and anode. To reduce the cost of the catalyst, fuel cells constructed according to the present invention may not use platinum at all, or may use platinum in very small amounts.

The present invention further includes an improved method for generating electricity from a fuel cell having a first electrode and a second electrode, such that at least one electrode is formed from a nano-carbon material. An ion exchange membrane may be positioned between the first electrode and the second electrode. Oxygen is directed to the one electrode, and hydrogen is directed to the other electrode. To increase the efficiency of the fuel cell, the electrode containing nano-carbon material is irradiated with blue color diode light, or electric current is directed to the nano-carbon electrode.

Other features and advantages of the invention will become apparent from the following detailed description.

DETAILED DESCRIPTION OF THE PREFERRED EMBODIMENTS

The present invention is directed to constructing the electrodes and/or the catalyst material of an electrochemical fuel cell unit using hydrogen storable (absorbable) carbon material, such as, but not limited to, fullerenes, carbon nano-tubes, carbon nanofibers, and/or metal encapsulated fullerenes incorporating platinum family metals, collectively, "nano-carbon materials". Embodiments of the present invention include increasing the efficiency of the catalytic function of the fuel cell by irradiating the catalyst with blue color diode light, and/or by conducting electric current to the catalyst. The catalyst may be incorporated into an electrode, or may be a separate member of the fuel cell. The present invention further includes methods of producing the fuel cells using inexpensive methodology, when the electrochemical fuel cells are produced in mass quantities. The present invention is primarily used for fuel cell electric power generation, and incorporates into the fuel cell one or more nano-carbon materials having hydrogen absorbable properties, for example, from the fullerene family.

Specifically, the present invention relates to PEM fuel cells utilizing hydrogen as the fuel and oxygen containing air as the oxidant. An improvement over previously known fuel cells is that the present invention incorporates into one or both electrodes, which may include the catalyst, or into the catalyst some hydrogen absorbable carbon material, such as fullerenes, carbon nanotubes, carbon nanohorns, nanofibers, metal encapsulated fullerenes (alone or in combination). Embodiments of a fuel cell incorporating the present invention include a membrane between the cathode and anode constructed from a cationic material.

A fuel cell needs a constant supply of fuel (hydrogen) to the anode. Thus, the fuel circulation system can become very complicated. To solve some of the fuel circulation problem, one aspect of the present invention includes incorporating a hydrogen storable substance at the anode side of the fuel cell. A hydrolysis cell produces hydrogen and oxygen; however, in some applications, only oxygen is used and the hydrogen is not needed. If the cathode is operated using the following formula:

Cathode: $2H_2O \longrightarrow O_2 + 4H^+ + 4e^-$ and the anode is constructed to include a hydrogen storable (absorbable) substance, the following process occurs, and there will not be free hydrogen:

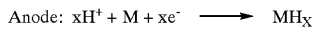

Anode: $xH^+ + M + xe^- \longrightarrow MH_X$ (wherein M is a hydrogen storable material).

Known hydrogen storable substances include $LaNi_5$, $MmNi_xAl_yMn_z$ (wherein Mm is the so called "Misch Metal") and NiTi alloys. When such hydrogen storable metals are used in a fuel cell having a cationic membrane that is a very strong acid, oxidation occurs to the metal substance, and it is not practical to use such fuel cells in a commercial environment. Moreover, platinum is used in most such fuel cells. However, the production of such fuel cells is very limited, since platinum is a very expensive and rare precious metal. Fuel cells constructed according to the present invention may not use platinum at all, or may use platinum in very small amounts. This reduction or elimination in the use of platinum is accomplished by using a fullerene, carbon nanotube, carbon nanohorn, carbon nanofiber or metal encapsulated fullerene to generate active hydrogen and produce an efficient fuel cell system.

To overcome some of the aforementioned deficiencies of current fuel cell technology, the present invention is directed to fuel cells using electrodes incorporating one or more substances that are hydrogen storable elements, such as fullerenes, carbon nanotubes, carbon nanohorns, carbon nanofibers and metal encapsulated fullerenes. The metal encapsulated fullerenes include platinum group metals, which possess the capability of the catalytic function of separating a hydrogen molecule to a proton and an electron. The efficiency of the catalytic function may be increased by applying external energy, such as radiating the catalyst with blue light and/or conducting an electric current to the catalyst. One embodiment of a fuel cell stack of the present invention includes a membrane positioned between two electrodes (a cathode and an anode), such that one electrode contains a metal encapsulated fullerene that is capable of the catalytic function and the other electrode does not contain the metal encapsulated fullerene.

In recent years, special attention has been paid to new carbon substances like fullerene. Different fullerene's chemical representation are often shown as $C_{60}$, $C_{70}$, $C_{120}$, etc. These carbon compounds are each formed with a hexagon or five-corners shape. One of the most well known substances is $C_{60}$, a twelve times five-corners shape, and thirty-two times hexagon shape formation, commonly called a "buckminster fullerene" or "buckyball." The characteristics of fullerenes are known to produce doping alkaloid metal in between frames of $M_3C_{60}$ (wherein M is an alkaloid metal, such as potassium, rubidium, etc.), and to encapsulate such metals as lanthanum and calcium in the formation of compounds like $LaC_{82}$, $La_2C_{82}$ and $C_{60}$.

A fullerene molecule cannot be used alone as catalyst for a hydrogen molecule to separate hydrogen into a proton and a electron. Similarly, a fullerene molecule cannot be used alone to store hydrogen released during a hydrolysis reaction. However, by adding a functional catalyst, such as platinum group metals or another carbon family substance, the compound can be used to produce very functional electrodes, or the compound can be used to store hydrogen. Such a fullerene-platinum compound is very durable for use in the extreme acid conditions associated with a cationic membrane.

Fuel cells constructed according to the present invention can be utilized for vast area of electrical generation purposes. The electrodes containing fullerene molecules may be mixed with platinum group metals compounds or common fuel cell carbon substances, such as graphite. Active carbon containing platinum group metals may mix with fullerene molecules by using polytetrafluoroethylene (PTFE) like a glue to adhere the electrodes on either side of a cationic membrane (electrolyte). Also, fullerene electrodes may be adhered to a cationic membrane by using a bio-solvent and water mixture as a glue. For constructing the cationic membrane, a perfluorocarbon or stilenge-benil-benzine equal volume mixture is used as the base for the membrane. Ion exchange in the membrane is accomplished by using a sulfonic acid ($HSO_3$) foundation or kalopon-acid foundation.

An oxygen-fullerene based fuel cell may be configured by constructing the anode from a compound including one or more fullerene molecules and one or more hydrogen storable (absorbable) substances, such that oxygen or air is supplied to the cathode. Hydrogen may be stored in the anode before or after making fullerene-containing electrode. Similarly, a fullerene-containing anode may be used for constructing a hydrogen battery in a closed container. Such a battery can be disposed of after discharge, or can be recharged with hydrogen from an external source through an intake hole for reuse of the battery. The use of such a fullerene-containing anode that stores hydrogen in a fuel cell or battery eliminates the need for complicated gas feeding and extracting circulation systems. Thus, such fuel cells and batteries may be economical and convenient for some particular applications.

Also, the oxygen electrode (cathode) may be used to supply hydrogen to the fullerene-containing electrode (anode). For example, if a platinum encapsulated carbon family substance is used for the oxygen electrode (combining oxygen with hydrogen to form water), then that substance also may be useable as a hydrogen electrode (forming hydrogen ions). In such an application, instead of feeding oxygen or air to the cathode, hydrogen is fed to the cathode from outside, and electricity is conducted between the cathode and the anode so as to store hydrogen in the anode by following electrochemical reaction:

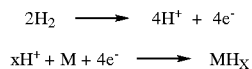

(wherein M is a hydrogen storable material)

In an embodiment of a fuel cell or battery configured with electrodes that contain platinum encapsulated fullerene molecules, the catalytic function of the electrodes may be increased by radiating light energy, for example blue diode light, onto the fullerene molecules.

A catalyst for the electrodes is necessary to construct an efficient fuel cell using fullerene family carbon molecules. This is especially true when using fuel cells for automobile use, even when pure hydrogen is used at the anode, and the oxygen side of the electrode (cathode) must be very efficient. For a hydrogen and oxygen fuel cell electrode system, the electrode (anode) on the hydrogen (fuel) side may be constructed without using platinum, if the carbon monoxide output of the fuel cell is about one thousand parts-per-million. At the oxygen (air) electrode (cathode) a passing voltage decline of about one-hundred millivolts decrease is desirable. The efficiency of the fuel cell possibly may be increased by adjusting the fullerene content amount, and/or by changing and trying different carbon family substances.

As mentioned above, the present invention of an improved fuel cell stack includes constructing one of the electrodes with a fullerene material mixed with a metal capable of catalytic function. A fullerene molecule itself is not able to store hydrogen, but by using platinum group metals in the compound, fullerene molecules can electrochemically store hydrogen. In addition, when fullerene carbon family substance are used to construct an electrode, such electrodes are very durable for use with acid containing solid ion-based conductor, and such electrodes will not be easily damaged. Thus, a long life fuel cell may be built. If the present invention is utilized for a fuel cell, such that only oxygen or air is sent to the cathode side, then electricity can be produced. Hydrogen may be stored at the anode side before commencing operation of the fuel cell, and no need to supply hydrogen to the anode. Therefore, the system and structure of the fuel cell may become very simple.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A fuel cell, comprising:

an electrode Conned from a carbon material selected from the group consisting of fullerene, carbon nanotube, carbon nanohorn, carbon nanofiber and metal encapsulated fullerene; and means for irradiating the electrode with blue color diode light.

2. A sandwich-type electrolyte fuel cell, comprising:

a first electrode;

a second electrode Conned from a carbon material selected from the group consisting of carbon nanotube, carbon nanohorn and carbon nanofiber;

an ion exchange membrane positioned between the first electrode and the second electrode; and means for irradiating the second electrode with blue color diode light.

3. The fuel cell of claim 2, further including means for irradiating the first electrode with blue color diode light where the first electrode is formed from a carbon material selected from the group consisting of carbon nanotube, carbon nanohorn and carbon nanofiber.

4. A sandwich-type electrolyte fuel cell, comprising:

a first electrode;

a second electrode formed from a fullerene encapsulated with a platinum family metal;

an ion exchange membrane positioned between the first electrode and the second electrode; and means for irradiating the catalyst with blue color diode light.

5. A method for generating electricity from a fuel cell, comprising:

providing a catalyst formed from a carbon material selected from the group consisting of fullerene, carbon nanotube, carbon nanohorn, carbon nanofiber and metal encapsulated fullerene; and irradiating the catalyst with blue color diode light.

6. A method for generating electricity from a fuel cell, comprising:

providing,
   (a) a first electrode,
   (b) a second electrode formed from a carbon material selected from the group consisting of fullerene, carbon nanotube, carbon nanohorn, carbon nanofiber and metal encapsulated fullerene, and
   (c) an ion exchange membrane positioned between the first electrode and the second electrode;

directing oxygen to the first electrode;

directing hydrogen to the second electrode; and irradiating the second electrode with blue color diode light.

* * * * *